3,013,037
METHOD OF PREPARING A DRYING OIL AND ALKYL ESTERS OF ALL-TRANS-8,10,12, OCTA-DECATRIENOIC ACID
Cecil R. Smith, Jr., Curtis A. Glass, and Ivan A. Wolff, Peoria, Ill., assignors to the United States of America as represented by the Secretary of Agriculture
No Drawing. Filed Apr. 7, 1960, Ser. No. 20,791
3 Claims. (Cl. 260—410.7)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention pertains to methods of preparing certain drying oil-type coating materials from novel sources and to the preparation of certain novel compounds having utility as drying oils or as intermediates for the preparation of drying oil and other compounds.

This is a continuation-in-part of application Serial No. 818,982, filed June 8, 1959.

In the course of an extensive investigation of the chemical compositions of the seeds of many less widely cultivated plants for unusual and potentially valuable constituents the availability of which could encourage extensive replacement planting in helpful partially substitution of major surplus crops, we have unexpectedly discovered that the principal constituent fatty acid (about 50–60 percent of the extractable fatty acid content) of the seed oil of the genus Dimorphotheca (represented by such species as *D. aurantiaca*, commonly called the "cape marigold," *D. annua*, *D. calendulaceae*, and *D. sinuata*) is the hitherto unknown acid 9-hydroxy-trans,trans-10-12-octadecadienoic acid. Having isolated and characterized this acid, we hereby assign it the trivial name dimorphecolic acid.

We have also found that the glycerides obtained by petroleum ether extraction of Dimorphotheca oil are trans-esterified by refluxing the glyceride oil with methanol in the presence of sodium methoxide to give a mixture of fatty acid methyl esters of which mixture at least half consists of methyl dimorphecolate, which is separable in pure form, after acidification and ether extraction, by countercurrent distribution in an acetonitrile-hexane system.

We have further found that refluxing Dimorphotheca oil with glacial acetic acid, or with a 0.2 percent solution of p-toluenesulfonic acid in xylene, dehydrates the dimorphecolic acid moieties of the glycerides to form glycerides containing all-trans-8,10,12-octadecatrienoic acid to the extent of at least 50 percent of the total fatty acid present. It is pointed out, however, that refluxing Dimorphotheca oil with xylene alone gives negligible yields of the triene while refluxing Dimorphotheca oil with xylene containing 2 percent rather than 0.2 percent of p-toluenesulfonic acid results in extensive polymerization and poor yields.

Refluxing Dimorphotheca oil with methanolic hydrochloric acid, on the other hand, simultaneously dehydrates the dimorphecolic acid moiety and trans-esterifies the glycerides to the methyl esters, thus forming a mixture of methyl esters comprising as a major portion the methyl ester of all-trans-8,10,12-octadecatrienoic acid, which can be isolated, for example, by countercurrent distribution in an acetonitrile-hexane system.

Films cast from a paint thinner solution of glacial acetic acid-dehydrated Dimorphotheca oil, at least half the fatty acid content of which treated oil consists of all-trans-8,10,12-octadecatrienoic acid, and also containing a standard lead naphthenate, cobalt naphthenate, manganese naphthenate drier (0.501 g. of the drying oil dissolved in 1 ml. of paint thinner containing 0.006 g./ml. of mixed metal naphthenates) proved superior in film-drying time even to films cast from a tung oil composition, as shown in Table I.

TABLE I

| Oil | Hours to be tacky | Hours to set to touch [1] |
|---|---|---|
| Dimorphotheca | 1½ | 78 |
| HOAc-dehydrated Dimorphotheca | ½ | ¾ |
| Tung | ¾ | 1 |
| Linseed | 2 | 3 |

[1] Films aged 2 to 6 days achieved a degree of hardness which would be consistent with use in protective coating compositions.

It is apparent that dimorphecolic acid, the methyl ester of dimorphecolic acid, and the methyl ester of all-trans-8,10,12-octadecatrienoic acid all have utility as intermediates for the preparation of valuable film-forming drying oils. For example, the methyl ester of all-trans-8,10,12-octadecadienoic acid could be trans-esterified with pentaerythritol to provide an excellent drying oil.

The following specific examples further illustrate the practice of our invention.

*Example 1*

Coarsely crushed seeds of *Dimorphotheca aurantiaca* were extracted with petroleum ether in a Soxhlet extractor. The extracted glyceride oil was freed of solvent by evaporation and a 1.3 g. portion of the oil, at least half of the fatty acid content of which consisted of dimorphecolic acid, was saponified by stirring for 3 hours at room temperature with 0.8 N ethanolic KOH. Water was added to the mixture and the unsaponifiables were removed by extraction with ethyl ether. The aqueous-alcoholic solution was made just acid to litmus with sulfuric acid, thus freeing the fatty acids from their soaps. The free fatty acids were promptly extracted with 3–4 portions of ether. After drying the pooled ether extracts over sodium sulfate and evaporating the ether, 1.0 g. of free fatty acids remained. These were then dissolved in 10 ml. of acetonitrile saturated with hexane. The above solution was then extracted with five 10-ml. portions of hexane saturated with acetonitrile. The acetonitrile layer was evaporated, leaving dimorphecolic acid as a yellowish semisolid material (75–85 percent of theoretical yield, and having a specific UV absorbency value in ethanol of 1020 at 230 m$\mu$).

*Example 2*

A 27.9 g. portion of Dimorphotheca oil obtained by petroleum ether extraction as in Example 1 was trans-esterified by refluxing for 2 hours in 200 ml. of methanolic sodium hydroxide (prepared by dissolving 4.0 g. of sodium per liter of methanol). The mixture was then acidified by the dropwise addition of acetic acid and diluted with 400 ml. of water. The methyl esters were extracted with 4 successive portions of diethyl ether. The extracts were pooled, dried over sodium sulfate, and evaporated to give 22 g. of the mixed methyl esters. A 3.4 g. portion of the mixed esters was subjected to countercurrent distribution in a 30 tube Craig-Post apparatus, using a 1:1 acetonitrile-hexane system. Methyl dimorphecolate (2.1 gm.) was obtained by pooling and evaporating the contents of tubes 3 to 12, and was found to have a neutral equivalent of 305 (calculated 310) and an infrared maximum at 2.9$\mu$, indicating the presence of hydroxyl.

Example 3

Dimorphotheca oil (1.096 g.) was refluxed with 50 ml. glacial acetic acid under nitrogen for 1½ hours. The solution was then withdrawn, diluted with water, extracted 4 times with petroleum ether, dried over sodium sulfate, and evaporated to yield a yellow oil whose ultraviolet spectrum in isooctane gave an E value of 1045 at 268 m$\mu$, indicating about 50 percent of conjugated triene. This represents essentially 100 percent conversion of the conjugated hydroxydiene originally present.

Example 4

Dimorphotheca oil (1.007 g.) was refluxed under nitrogen with 0.1 g. of p-toluenesulfonic acid monohydrate in 50 ml. of xylene for 1 hour and then treated as in Example 3. Ultraviolet measurements in isooctane at 268 m$\mu$ gave an E value of 701. This indicated 67 percent conversion of conjugated diene to triene; the latter was present in the product to the extent of 32 percent.

Example 5

Dimorphotheca oil (1.07 g.) was refluxed with 50 ml. of 0.25 N methanolic hydrochloric acid under nitrogen for 2 hours forming the methyl ester of all-trans-8,10,12-octadecatrienoic acid. The product was treated as in Example 3 and the ultraviolet spectrum in isooctane determined. The maximum at 268 m$\mu$ showed the E value to be 990. Essentially quantitative conversion of diene to triene was indicated.

Having fully disclosed our invention, we claim:

1. A method of preparing a lower alkyl ester of all-trans-8,10,12-octadecatrienoic acid, comprising subjecting Dimorphotheca oil, containing constituent 9-hydroxy-trans,trans 10,12-octadecadienoic acid, to reflux under nitrogen for about 1 to 2 hours with a lower alkanolic hydrochloric acid.

2. The method of claim 1 wherein the alkanoic hydrochloric acid is 0.25 N methanolic hydrochloric acid.

3. A method of preparing a glyceride drying oil in which at least half of the fatty acid content consists of all-trans-8,10,12-octadecatrienoic acid, said method comprising subjecting Dimorphotheca seed oil to reflux under nitrogen for about 1 to 2 hours with a dehydrating agent selected from the group consisting of glacial acetic acid and 0.2 percent of p-toluenesulfonic acid in xylene.

References Cited in the file of this patent
UNITED STATES PATENTS

| | | |
|---|---|---|
| 2,242,230 | Burr | May 20, 1941 |
| 2,307,794 | Jordan | Jan. 12, 1943 |
| 2,433,097 | Debacher | Dec. 23, 1947 |

OTHER REFERENCES

I—Chemical Abstracts, page 17730, last two lines to page 17731, line 3, (1957).

II—Chemical Abstracts, page 1763, line 32 (1937).

Bailey: "Industrial Oil and Fat Products," Interscience Publishers, Inc., New York, pages 796 to 801, 913 and 914 (1951).